INVENTOR.
JOHN C. SIMS, JR.
BY
AGENT

United States Patent Office 2,892,970
Patented June 30, 1959

2,892,970

MAGNETIC CORE RESETTING DEVICES

John C. Sims, Jr., Spring House, Pa., assignor to Sperry Rand Corporation, New York, N.Y., a corporation of Delaware Application June 1, 1955, Serial No. 512,412

17 Claims. (Cl. 317—123)

This invention relates to devices for resetting magnetic cores. In the electronic arts, a transformer is often employed wherein one of its windings is pulsed with unidirectional pulses. This causes unidirectional pulses of magnetizing forces to occur in the core which tend to drive the core up its hysteresis loop and thus reduce the effectiveness of the core. While it is possible to apply opposite surges of magnetizing force from time to time to restore the core to its datum point of operation, this has not heretofore been practical when the active pulses applied to the core have been in varying magnitude. For example, if the incoming pulses vary considerably, it would be impossible to predict exactly how much restoring magnetizing force would be necessary to return the core to its datum point. The present invention is concerned with overcoming this difficulty and enabling the core to be returned accurately to its datum point irrespective of the magnitude of the incoming pulses fed to the input coil on the core.

The invention has as its primary object the provision of means for applying a measured amount of restoring magnetizing force to the core during the spaces between incoming pulses of energy fed to the transformer.

Another object of the invention is to provide a simple and reliable means for resetting a magnetic core to its datum point of operation.

In one specific device for carrying out the aforesaid objects, the magnetic core is part of a transformer having an input or primary winding fed by spaced pulses of varying magnitude. These pulses would tend to drive the core up its hysteresis loop in the absence of some resetting means. The transformer may have a secondary connected to the load. The means for resetting the core to the datum point on its hysteresis loop comprises another secondary winding on said transformer which is connected in parallel with the primary winding of a second transformer. The second transformer has a core with a substantially rectangular hysteresis loop. Since the primary of the latter transformer is energized by the secondary of the first named transformer, the last named transformer will be driven up its hysteresis loop in proportion to the amount the first named transformer was driven up its hysteresis loop. If then, periodically between application of pulses to the primary of the first transformer, there is applied a large surge or pulse through the secondary of the second transformer, sufficient to saturate its core, a measured amount of energy will be fed through the second named secondary on the first transformer, which will be just sufficient to restore the first transformer to the datum point on its hysteresis loop. To illustrate this embodiment of the invention in greater detail, reference is made to the following drawings.

Figure 1:
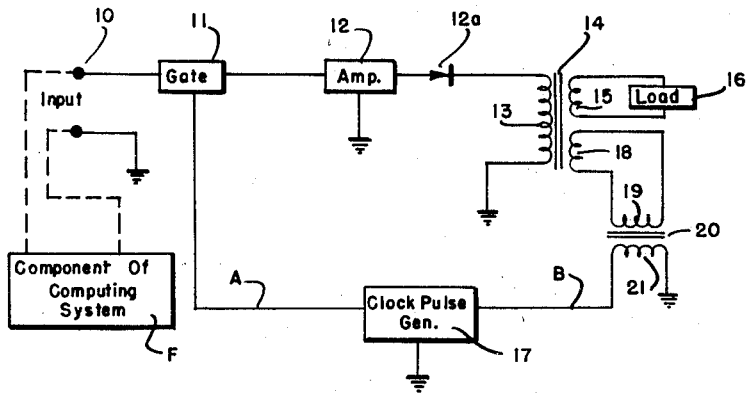
Figure 1 is a schematic diagram of a circuit employing the invention.

In Figure 1 an input 10 is adapted to receive periodic pulses of varying magnitude which are to be amplified and delivered to the load 16. In one specific circuit in which the present invention may be applied, the input 10 is fed through a gate 11 and an amplifier 12 which has an output rectifier 12a. These pulses may be fed through the primary 13 of a transformer 14 which has a secondary 15 feeding the load 16. The said transformer may have its core 14 composed of any suitable magnetic material such as silicon steel. Since no magnetic material has a perfectly linear B–H curve, it is clear that as the unidirectional pulses are fed through the primary 13 that they repeatedly magnetize the core 14 in the same direction and thus tend to drive the core up its hysteresis loop. As the core approaches the saturation point, the effectiveness of the transformer is reduced. Since the invention is particularly applicable to circuits employing unidirectional spaced pulses which are to be amplified, it would be possible to attempt to restore the core 14 to a datum point on its hysteresis loop during the spaces between pulses. However, the prior art fails to show how this can be done when the pulses vary in magnitude. If a restoring pulse of arbitrary size is delivered to the transformer, it may either fail to restore the transformer core sufficiently, and positive errors will accumulate to carry it to positive saturation, or elese the restoring pulse will be too large and will eventually drive it into negative saturation. In either case loss of efficiency results.

Figure 2:
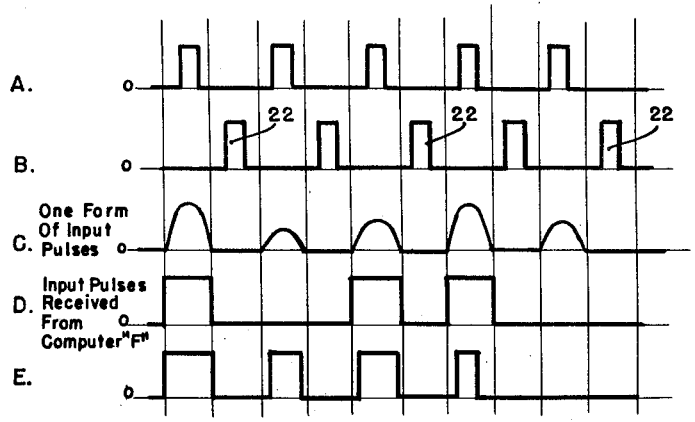
Figure 2 is a timing diagram used in explaining the circuit of Figure 1.

In Figure 2 one form that the input pulses may take is shown along line C where the pulses are shown as ones varying considerably in magnitude. It is understood that the apparatus will also function in combination with computing systems where presence or absence of input pulses is an indication of the certain information to be fed to the load. For example, in a binary computer or data translating system the pulses, when they ocur, are all of the same magnitude and they can only occur at certain predetermined periodic intervals. The signaling is performed by omitting selected pulses from time to time. The invention is equally applicable to that type of circuit, and Figure 2 shows this form of pulse information along line D where, instead of the input pulses varying in magnitude, they are either present or absent at periods concurrently with each clock pulse A. Figure 1 shows a component F of a computing system which feeds the pulses shown in said line D (Figure 2) to the input of the system of Figure 1. Moreover, the invention is applicable to a series of input pulses such as those shown along line E where the width of the pulses varies. Moreover, combinations of the waveforms of lines C, D and E may be applied to the input.

Figure 3:
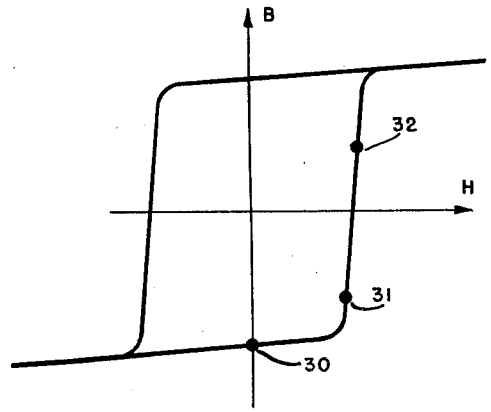
Figure 3 shows the hysteresis loop for the core 20 of Figure 1.

Clock pulse generator 17 produces pulses on wire A, as shown in Figure 2, which are fed to gate 11 so as to open that gate only at the periodic intervals when a pulse occurs on wire A. This insures that primary 13 is fed with pulses only at predetermined periodic intervals. The detailed description of Figure 1 up to this point describes one conventional amplifying circuit which is especially useful in computing systems. The improvement claimed in this application resides in the addition of parts 18 to 21 inclusive to the previously disclosed circuit. Transformer 14 has an additional secondary winding 18 which is interconnected with the primary winding 19 of another transformer which has a core 20. The latter core is composed of a material having a substantially rectangular hysteresis loop as shown in Figure 3. It also has secondary winding 21 fed by pulses from generator 17 ocurring on wire B. The relation of the pulses on wires A and B is shown in Figure 2. During the spaces between the pulses on wire A, pulses occur on wire B which flow through secondary winding 21 and drive the core 20 to negative saturation. Each pulse on wire B is of ample magnitude that in event the core 20 has been previously driven clear into positive saturation, such pulse will immediately and promptly drive it to negative saturation. Hence it may be assumed that at the start of the apparatus the core 20 is at negative remanence 30 on its hysteresis loop. The core 14 would be at a datum point on its hysteresis loop. The datum point is usually on the H axis of the loop. As the first input pulse is received at 10 and flows though coil 13 in amplified magnitude, it drives the core 14 somewhat up its hysteresis loop. This induces a potential in coil 18 which causes a flow of current through primary 19 and drives the core 20 up its hysteresis loop from negative remanence 30 to say point 31 (see Figure 3). The set input pulse could occur only during one of the positive pulses on wire A because the gate 11 will be open during that interval. At the conclusion of the pulse on wire A, gate 11 closes and current ceases to flow through primary 13 but due to its characteristics the core 14 does not return to its original datum point. However, when a pulse occurs on wire B during the space between pulses on wire A, the heavy surge of current through coil 21 drives the core 20 to negative saturation. At the beginning of this pulse the core was at point 31, where it was left by the effect of the input pulse received at input 10. The heavy surge of current on wire B then drives the core from point 31 through negative remanence 30 toward negative saturation. Between the point 31 and the point 30 there is a change of flux in the core which induces potential in coil 19 but as the core 20 is driven from negative remanence 30 on into negative saturation there is very little further change of flux in the core 20 and consequently no further substantial potential is induced in the coil 19. The potential, induced in primary 19, causes a flow of current in secondary 18 which produces a magnetizing force in the core 14 equal and opposite to that previously applied to the core and therefore returns the core accurately to its datum point. If it now be assumed that the input pulse fed to input 10 is considerably larger than in the previous illustration, the same chain of events would happen except that core 14 would be driven much farther up its hysteresis loop and core 20 would be driven much farther up its hysteresis loop, for example, to point 32 of Figure 3 instead of to point 31. The last named input pulse can of course only occur during one of the pulses on wire A and during the space between said pulses a pulse on wire B occurs which drives the core 20 from point 32 through points 31 and 30 into negative saturation. In doing so, the flux change in the core is much greater than heretofore since the portion of the curve from point 32 to point 30 is substantially linear and is much greater than the distance from point 31 to point 30. Hence a greater potential is induced in coil 19 than previously which causes a greater flow of restoring or resetting current in coil 18 and therefore a greater magnetizing force is applied to core 14 in a direction opposite to the magnetizing force due to the input signal. Consequently the core 14 is accurately returned to its datum point.

It is unnecessary for the pulses on wire B to occur at the same repetition rate as the pulses on wire A. All that is necessary is that periodically a pulse shall occur on wire B during a space between two pulses on wire A. For example, the alternate pulses 22 on wire B could be omitted and the device still function. If this were done, it is clear that two input pulses could successively drive the core 14 up its hysteresis loop and if these pulses were of sufficiently low magnitude that they did not saturate the core 14, the first-named transformer would function efficiently. These successive pulses would not only drive the core 14 up its hysteresis loop through successive steps but would do likewise to core 20 and hence core 20 might well be driven from negative remanence 30 to point 31 by virtue of the first input pulse and from point 31 to point 32 by virtue of the second input pulse and it would remain at point 32 until the next pulse on wire B which would drive core 20 to negative remanence and thus induce a potential in coil 19 adequate to restore core 14 to its datum point.

However, in the preferred form of the invention the pulses occur on wire B in each space between pulses on wire A. This can be conveniently accomplished by having a clock pulse generator 17 supply pulses to wire A directly and to wire B through a suitable delay line so that the pulses on the latter wire occur during the spaces between the pulses on wire A.

It is clear therefore that the invention provides means for providing an accurately measured restoring or resetting magnetizing force to the core 14 which is just sufficient to always return it to the datum point on its hysteresis loop and therefore prevent that core from being worked up its hysteresis loop.

While I have illustrated one particular form of the invention and shown its application to one particular form of circuit, it should be made clear that the invention may be carried out in other ways and moreover may be applied to a wide variety of circuits.

I claim to have invented:

1. In combination, a first magnetic core, means for applying spaced pulses of magnetizing force to the first core which tend to drive the said first core a variable distance along its hysteresis loop from a datum point, and means for returning the said first core to said datum point on its hysteresis loop during spaces between said pulses comprising a second magnetic core, a circuit including first and second interconnected coils on said first and second cores, respectively, whereby said second core is also variably driven along its hysteresis loop upon application of said spaced pulses to said first core and means for saturating the second core during the space between successive ones of said spaced pulses thereby to effect a resetting pulse in said first and second interconnected coils the magnitude of which depends upon the distance said first core has been driven along its hysteresis loop from said datum point.

2. The combination of claim 1 in which the second core is composed of material having a substantially rectangular hysteresis loop.

3. In combination; a first magnetic core; means for applying pulses of magnetizing force to the said first core which vary in magnitude and which tend to drive the core variable distances along its hysteresis loop; and means for returning the said first core to a datum point on its hysteresis loop during spaces between said pulses comprising a second core, coils on said first and second cores, means interconnecting said coils to one another so that said pulses of magnetizing force in the first core will induce a potential in the coil on said first core which will cause flow of current in the coil on the second core and thus drive the second core along its hysteresis loop in a first direction by a variable distance corresponding to the variable distance said first core is driven along its hysteresis loop, and means operative intermediate the occurrence of successive ones of said pulses for driving the second core to saturation in a direction opposite said first one, whereby a resetting pulse is induced in said coils which resetting pulse has a variable magnitude dependent upon the distances said cores had been driven along their respective hysteresis loops prior to operation of said last-named means.

4. The combination of claim 3 in which the second core is composed of material having a substantially rectangular hysteresis loop.

5. The combination of claim 4 in which the last-named means comprises a coil on the second core and a pulse generator which supplies pulses to the last-named coil during spaces between said pulses of magnetizing force which are applied to the first-named core.

6. The combination of claim 5 in which the last-named pulse generator supplies a pulse to the last-named coil during each space between pulses of magnetizing force applied to the first-named core.

7. In combination; a magnetic core; means for applying pulses of magnetizing force to the core which vary in magnitude and which tend to drive the core variable distances along its hysteresis loop thereby to effect variable flux changes in said core; and means for returning the said core to a datum point on its hysteresis loop during spaces between each of said pulses comprising resetting pulse generating means responsive to the amount of flux change in said core for producing variable magnitude resetting pulses, and means for applying said variable magnitude resetting pulses to said core thereby to produce an equal and opposite measured flux change in said core during the space between successive ones of said first mentioned pulses.

8. In combination; a magnetic core; means for applying pulses of magnetizing force to the core which vary in magnitude and which tend to drive the core along its hysteresis loop in an unsaturated region thereof; and means operative during spaces between pulses of said magnetizing force for periodically applying a variable magnitude restoring magnetizing force which produces a measured flux change in the core equal and opposite to the integrated flux change that has taken place since occurrence of the preceding restoring magnetizing force whereby said core is caused to operate substantially continuously in said unsaturated region thereof.

9. In combination; a magnetic core; means for applying pulses of magnetizing force to the core which vary in magnitude and which tend to drive the core variable distances along its hysteresis loop; and pulse generating means operative intermediate successive ones of said pulses and responsive to the amount of flux change in the core for applying variable magnitude substantially equal and opposite restoring magnetizing forces which return the said core to a datum point on its hysteresis loop.

10. The combination of claim 1 in which the first-named means produces pulses that vary in amplitude so that different pulses tend to drive the first core up its hysteresis loop by varying amounts.

11. The combination of claim 1 in which the first-named means produces pulses that vary in width so that different pulses tend to drive the first core up its hysteresis loop by varying amounts.

12. The combination of claim 1 in which the first-named means produces pulses of constant amplitude and width but which vary in repetition rate and thus tend to irregularly drive the first core up its hysteresis loop.

13. In combination, a transformer comprising a magnetic core having winding means thereon, means for applying spaced input pulses to said winding means operative to drive said core for variable distances along its hysteresis loop from an unsaturated datum hysteresis point to further unsaturated hysteretic operating points, variable potential means responsive to the distance said core is driven from its said unsaturated datum point to said further unsaturated hysteretic operating points by said pulses for producing a variable magnitude resetting potential, and means coupling said variable magnitude resetting potential to said winding means intermediate occurrence of adjacent ones of said spaced input pulses thereby to reset said core to said unsaturated datum point.

14. In combination, a magnetic core having first winding means thereon, means for applying spaced pulses to said first winding means thereby to drive said core for variable distances along its hysteresis loop from a datum hysteresis point to further hysteretic operating points, variable potential means responsive to the distance said core is driven from its said datum hysteresis point by said pulses for producing a variable magnitude resetting potential, said variable potential means comprising a further core of magnetic material, means for variably driving said further core along its hysteresis loop from a datum point for a distance corresponding to the variable distance said first mentioned core is driven by said pulses, second winding means on said further core, means for periodically returning said further core to said datum point thereof whereby said variable magnitude resetting potential is induced in said second winding means of said further core during said periodic return of said further core to its said datum point, and means coupling said variable magnitude resetting potential to said first winding means intermediate occurrence of adjacent ones of said spaced pulses thereby to reset said first mentioned core to its said datum hysteresis point.

15. The combination of claim 14 wherein said further core comprises a magnetic material exhibiting a substantially rectangular hysteresis loop, said datum hysteretic point for said further core being located in a saturation region of said further core.

16. In combination, a magnetic core having a pair of opposite polarity saturation regions and having an unsaturated operating region therebetween, said core normally operating at a datum point in said unsaturated operating region located substantially intermediate said saturation regions, variable input means for driving said core variable distances along its hysteresis loop from said datum point to other unsaturated operating points in said unsaturated operating region closer to a saturation region thereof, and resetting means periodically operative to reset said core from said other unsaturated operating points to said unsaturated datum point in said unsaturated operating region whereby said core always operates in said unsaturated operating region and is not driven into a saturation region by said input means, said resetting means comprising means responsive to the flux change in said core, which has occurred since the previous operation of said resetting means, due to operation of said variable input means in driving said core to said other unsaturated operating points for producing a measured magnetomotive force in said core having a magnitude and polarity just sufficient to return said core substantially to said unsaturated datum point.

17. In combination, a core of magnetic material having saturated and unsaturated operating regions, said core normally operating about a datum point in one of said regions, control means for applying magnetomotive forces to said core to cause said core to be driven away from said datum point in said one region, and resetting means operative subsequent to operation of said control means for resetting said core substantially to said datum point thereby to assure that said core constantly operates in said one region and cannot be driven into the other operating region thereof by said control means, said resetting means comprising means for periodically measuring the amount said core has been driven away from said datum operating point and for applying a measured resetting magnetomotive force to said core just sufficient to return said core substantially to said datum point.

References Cited in the file of this patent
UNITED STATES PATENTS

| | | |
|---|---|---|
| 1,923,311 | Hodgson | Aug. 22, 1933 |
| 2,709,248 | Rosenberg | May 24, 1955 |
| 2,713,675 | Schmitt | July 19, 1955 |
| 2,783,315 | Ramey | Feb. 26, 1957 |

FOREIGN PATENTS

| | | |
|---|---|---|
| 721,669 | Great Britain | Jan. 12, 1955 |